Dec. 19, 1961     S. R. BALLOU ET AL     3,013,896
LINING MACHINES AND METHODS OF LINING
Filed May 19, 1959     3 Sheets-Sheet 1
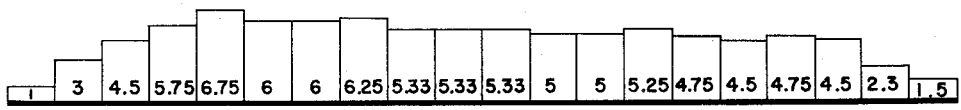
MEASURED FILM WEIGHT VERSUS TIME     *FIG.1*
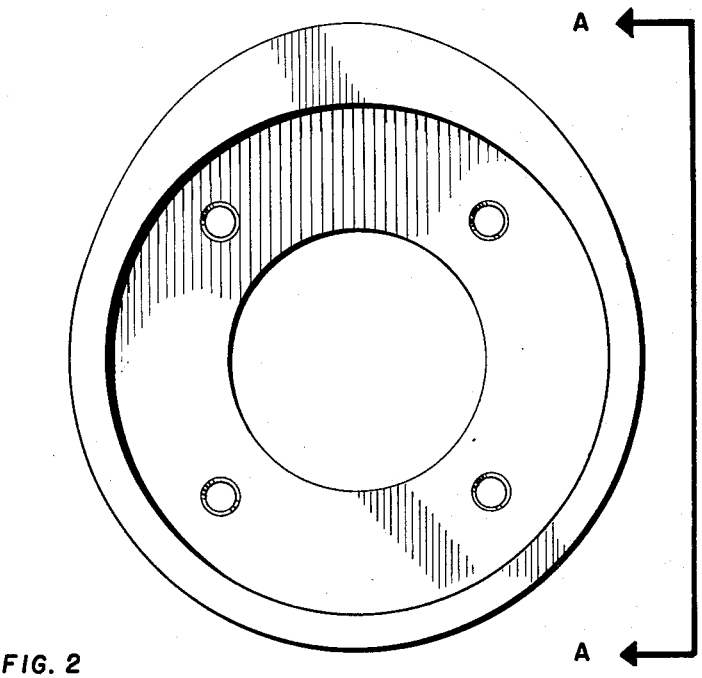
*FIG. 2*

Dec. 19, 1961 S. R. BALLOU ET AL 3,013,896
LINING MACHINES AND METHODS OF LINING
Filed May 19, 1959 3 Sheets-Sheet 2

MEASURED FILM WEIGHT USING STANDARD CAM

Dec. 19, 1961 S. R. BALLOU ET AL 3,013,896
LINING MACHINES AND METHODS OF LINING
Filed May 19, 1959 3 Sheets-Sheet 3

3,013,896
LINING MACHINES AND METHODS OF LINING
Sidney R. Ballou, Lexington, and Charles E. Chapman, Chelsea, Mass., assignors to W. R. Grace & Co., Cambridge, Mass., a corporation of Connecticut
Filed May 19, 1959, Ser. No. 814,268
5 Claims. (Cl. 117—43)

Sealing compounds for can covers ("ends") or for glass jar closures are commonly applied to the closures in liquid form. The machines, called "lining machines," which apply the compound to the joint area, have, as essential operating elements, a continuously rotating chuck which receives and rotates the closure, a "nozzle," essentially a squirt gun, controlled by a needle valve which projects the compound downwardly onto the joint area of the closure and a quick opening and closing cam which lifts the needle valve and closes it at the proper instant. Thereby a ring of fluid compound is formed on the joint area adjacent the periphery of the closure. This ring of compound, whether in liquid form or later when it is dried, or "fluxed" into a solid mass is called the "lining." Its function is to form the gasket between the can parts and hermetically seal the can.

The elements of the machine have remained essentially the same for more than 50 years, but like the automobile engine, they have been refined and the machine operation speeded until today the machines deliver from 360 to 800 lined ends per minute.

Although mechanical refinement has been responsible for the smooth operation of the machine at such speeds, the major improvement has flowed from the improved chemistry of the lining compounds themselves. With chuck speeds now reaching 2600 to 2800 r.p.m., compounds would fly off the end as spray, if it were not for the fact that the plasticity of the compounds was progressively raised. Had not the techniques for the control of viscosity been progressively bettered, it would be impossible to lay a uniform stripe of compound 10 inches long and 3 mm. wide around the closure's periphery in a twentieth of a second. (The remaining time is required by the chuck loading and unloading operations.)

The increase of the speed of the machines has necessarily increased the rotational speed of the chuck which in turn has increased the centrifugal force to which the compound is subjected. The effects of this increased centrifugal force could be overcome by increasing the plasticity and viscosity of the compounds with excellent results as long as the placement of the compound in the gasket region of the container closure remained according to traditional principles. More recently, however, there has been a desire to change the location of the bulk of the compound in the gasket region which change has created a problem that rheology alone cannot solve.

To understand the significance of this change some understanding of the construction of a sanitary can is necessary. The body of the can is a cylindrical piece of sheet metal normally made by forming a rectangular piece of metal and then joining the ends of the rectangle along the side seam. The metal in the ends of the cylinder are flanged outwardly. The can is completed by placing a circular piece of metal called the "end" over each end of the cylinder and rolling the outer edge of the end and flange on the body together in a double seam. That portion of the end which covers the interior of the can is called the "panel." The outer periphery of the end is formed into a circular depression called the "channel" which cooperates with the flange on either end of the body. The outer edge of the channel called the "curl" is deformed upwardly and inwardly to provide contact of the can end with the inner side of the flange of the can body during the first stage of the double seaming operation. The inner wall of the channel, i.e., the portion between the channel and the panel, is known as the "shoulder."

The sealing compound is placed in the channel of the can end. Traditionally it has been desired to place the bulk of the compound under the curl. Such a placement was easy to accomplish since the normal centrifugal force applied to the compound by the spinning chuck tended to force the compound outwardly under the curl. Liner irregularities in compound placement under these circumstances created no problem since the action of the centrifugal force was such as to even out such irregularities.

More recently however, it has been found desirable to place the bulk of the compound in the channel next to the shoulder. Such so-called shoulder linings have been found to be very useful for pressure beverage cans such as those used for packaging beer and carbonated beverages. Shoulder lining has also been found to be useful in certain food cans.

To obtain such a placement of the compound on the can end, it is obviously necessary to use such a plastic compound that the compound will not be moved appreciably under the centrifugal force which is applied as the end spins on the chuck. It is also necessary that the quantity of compound per unit peripheral length of the channel of the end remain constant since the action of the centrifugal force can not be relied upon to smooth out irregularities. To a large degree this accurate placement of compound per unit peripheral length can be obtained by regulating very accurately the length of ribbon of compound applied so that the end of the ribbon exactly meets the beginning of the ribbon. This can be controlled by controlling accurately the instant at which the compound applying nozzle opens and closes. Conventionally the opening and closing of the nozzle has been controlled by the action of a quick-acting cam, and every effort has been directed toward making the nozzle open to a complete open position and close from the complete open position as quickly as possible. The intent has been to make the start and stop of the ribbon of compound applied by the nozzle to the closure element rotating thereunder as abrupt as possible in order to approximate as closely as possible the joining of the two ends in a butt joint.

However, we found that no matter how accurately we timed the opening and closing of the valve and how rapid a valve action we obtained there always remained one portion of the lining where apparently more compound was applied per unit of peripheral length than the remaining portions of the lining.

This effect can be seen by reference to the drawing in which:

FIGURE 1 is a graphical representation of the distribution of compound per unit of peripheral length when applied according to the present invention.

FIGURE 2 is a plan view of the improved cam which is useful in this invention.

Figure 4:
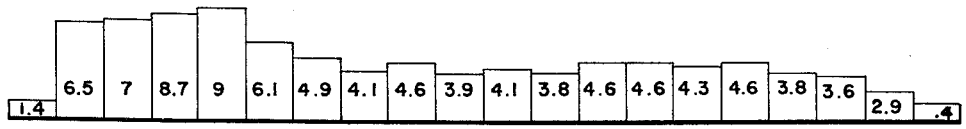
FIGURE 4 is a graphical representation of the normal distribution of compound per lineal unit of periphery of the closure element.
Figure 5:
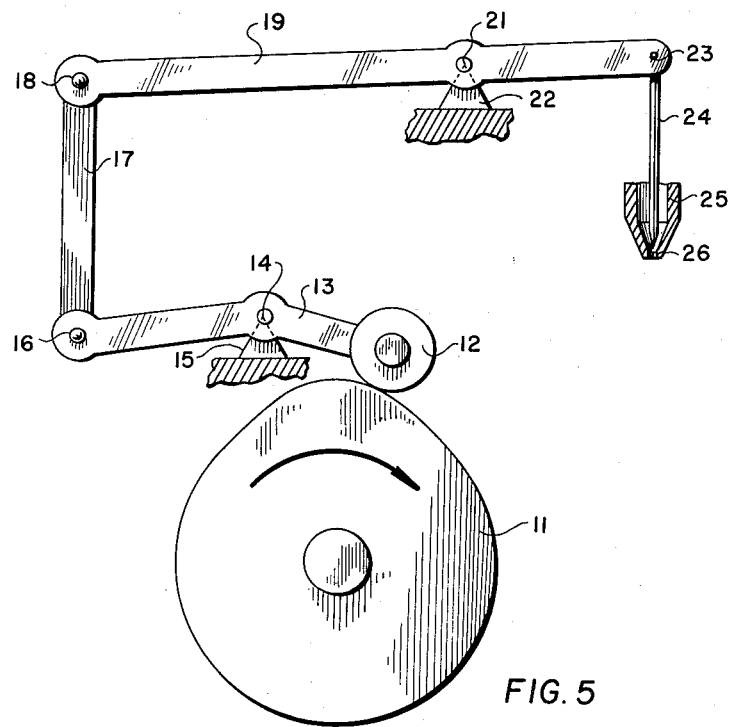
FIGURE 5 is a diagrammatic view of a needle valve nozzle and nozzle linkage controlled by the cam of the FIGURE 2.

To determine the cause of this apparent excess of compound at one portion of the periphery of the ribbon of compound, photographs of the stream of compound issuing from the nozzle were taken using high speed photographic techniques. These pictures clearly showed that as the nozzle was opened a blob of compound issued from the nozzle and as the nozzle remained open the compound stream appeared to become smaller and smaller. These observations were confirmed by running a strip of metal linearly under the nozzle at approximately the same velocity as the peripheral velocity of the can end when rotating on the chuck. The compound collected in this way was then divided into twenty equal linear portions and the weight of each portion was measured. These measurements are shown in FIGURE 4. It is clearly seen from this figure that the volume and hence the mass of compound delivered by the nozzle per unit time (i.e. the unit length of the lining) is very much greater during the initial portion of the lining cycle than it is near the end. It is also seen that the flow of compound starts much more abruptly than does it end thereby making it difficult to provide a uniform lap of the beginning and end of the compound stream.

It was obvious from this investigation that the difficulties noted above were caused by the fact that an excessive amount of compound was delivered per unit time during the initial stages of nozzle opening and complicated further by the fact that even though the nozzle itself opened and closed at the same rate, the flow of compound did not start and stop at the same rate. One possible explanation for this phenomenon is the fact that the compound is supplied to the nozzle under pressure. When the nozzle is closed the compound adjacent to the tip of the nozzle is under full pressure. As the compound is permitted to flow, the effective pressure of the compound adjacent to the tip is reduced by frictional losses. These observations indicated rather clearly that to a large degree the difficulties were caused by attempting to obtain instantaneous opening and closing of the nozzle.

We have discovered that the excessive egress of the compound during the first portion of the lining cycle can be avoided if the valve is made to open under a program in which the flow of compound initially is almost infinitesimal and under which the flow increases at a predetermined rate. We have also determined that if the valve is closed according to the same program and if the rate of change of compound flow is properly predetermined, then the beginning and end of the compound stream can be lapped so as to provide a substantially uniform quantity of compound for each unit peripheral length of the lining.

Figure 3:
FIGURE 3 is a side elevation partially in section along line A—A of FIGURE 2.

We accomplish this result by opening the needle valve by means of a cam having a peculiar design. The cam illustrated in FIGURES 2 and 3 is composed of two cycloids rising to their half-way point and placed back to back. The cycloids are joined by a sine curve of low amplitude. The extent of this cycloidal-sinusoidal-cycloidal cam face is 170° of the full circumference. Radially, the cam formula is:

$$\frac{\text{Cycloidal portion of lift}}{\text{Harmonic portion of lift}} = \frac{\pi}{2\sqrt{2}}$$

and $$\frac{\text{The sum of the cycloidal portion of the lift angle}}{\text{The harmonic portion of the lift angle}} = \frac{\sqrt{2}}{1}$$

With such a cam and the needle adjusted to the lifts shown, the compound flow rate versus time is shown in FIGURE 1. Since the flow of compound at the beginning and at the end of the cycle are equal and these portions overlie, they form what may be described as a scarfed joint in the deposited compound. The volume of compound in the joint equals with considerable exactitude the volume of compound in any other equal sector of the ring. Blobs and plug-flow are practically eliminated, because the very high pressure forcing the compound through what initially is an infinitesimal opening destroys the yield value at once. "Throw-out" disappears because the mass of the compound which is subjected to centrifugal force for the longest time is far smaller than the average mass of the lining. This is in contrast to the previous practice where the largest mass is subjected to the longest duration of spin.

Primarily, because there are hundreds of can lining machines in operation today, the cam has been chosen as the simplest and least expensive means of achieving this result. The simple change of a cam in an existing machine permits dependable high shoulder linings to be produced, but alternate methods to control the flow of compound through the nozzle are possible. The pressure on the compound could be varied in accordance with a suitable program. A lift of the needle could be pneumatically or hydraulically controlled. A sleeve or a diaphragm could be arranged to control the size of the orifice. None of these expedients appears to offer the simplicity which the industry demands.

A typical arrangement for using the cam of this invention to control the opening and closing of the conventional needle valve nozzle is shown in FIGURE 5. In this figure the cam of FIGURES 2 and 3 is represented by 11, and a conventional needle valve nozzle is represented by needle 24, nozzle 25, and orifice 26. The linkage between cam 11 and the nozzle is represented by cam follower 12, cam follower linkage 13, intermediate linkage 17, and nozzle linkage 19. Cam follower linkage is pivoted at cam follower linkage pivot point 14, which pivot point is mounted on cam follower linkage pivot support 15, and is connected to intermediate linkage 17 by linkage connection 16. Needle linkage 19 is pivoted at needle linkage pivot 21 which is supported by needle linkage pivot support 22 and is connected at one end to intermediate linkage 17 at linkage connection 18 and at the other end to needle 24 at needle connection 23.

Cam contours also can be somewhat changed and achieve approximately the same result. For example, instead of joining the two full cycloids by a sine wave, an effective cam may be made by placing two half cycloids back to back. It is also possible to produce an effective cam if the half cycloids are joined by a circular arc. Cycloidal-harmonic-cycloidal lining cams are preferred however, since they have excellent dynamic characteristics, lead to very smooth machine operation, and give dependable lining placement. To achieve a smooth transition between the cycloidal and harmonic curves three conditions must be fulfilled at the transition points. (1) The velocities of the two curves (the first derivative of displacement) must be equal. (2) The accelerations (the second derivative of displacement) must be equal. (3) The rates of change of acceleration (third derivative of displacement) must also be equal. With the contour described above, the transitions occur at point of maximum velocity and zero acceleration which are also the points of maximum rates of change of acceleration.

While the utility of this invention has been described previously with reference to the placing of lining compound in ends for cans, the cam described herein may also be used to control the placement of linings in other types of container closures and in the placement of liquid gasketing compounds in various industrial applications.

We claim:

1. In the art of lining closures with lining compounds which exhibit plasticity and wherein a blank closure is rotated beneath a nozzle having a valve, that method of producing high shoulder linings substantially without throwout which comprises opening the valve following a cycloidal program to cause the flow of compound through the nozzle to rise from zero to a maximum during a significant portion of the revolution of the closure, applying sufficient pressure to the compound to force compound through the nozzle at the instant of opening to destroy the yield value of the compound and eliminate plug flow, then closing the nozzle in a cycloidal program reciprocal to the opening cycle, and correlating the rotation of the closure with the opening and closing of the valve to form a scarfed joint having a substantially uniform quantity of compound in each unit peripheral length of the lining.

2. The method in accordance with claim 1 wherein the pressure causing the flow of compound through the nozzle is between 50 and 195 p.s.i.

3. In the art of lining closures wherein the closure is rotated beneath a nozzle, that method of substantially preventing throw-out during the lining operation of the liquid lining on the closure which comprises slowly increasing according to a cycloidal program the amount of lining compound deposited on the closure from zero to a maximum over a significant sector of the lining, slowly decreasing the flow of compound as the reciprocal of the rate of rise and causing the decreasing flow sector of the lining to overlie the sector of increasing flow, whereby that portion of the lining which is subjected to centrifugal force for the longest time is initially reduced in mass and throw-out is thereby resisted.

4. The method of preventing blobs of lining compound from being deposited upon a closure to be lined in which a lining compound is forced through a nozzle controlled by the needle valve to form a peripheral stripe of compound on said closure which includes lifting the needle by means of a cam having two opposed cycloidal cam faces to cause the infinitesimal opening of the valve in the first instance, applying sufficient pressure to the compound to force a miniscule amount of compound through the infinitesimal opening, thereby destroying the yield value of the compound and its tendency to form a blob, continuing the opening of the needle valve to permit an increasing flow of compound to extend over a significant sector of the lining and subsequently decreasing the flow of compound as the mirror image of the rate of increasing flow while so timing the operation of the valve with the revolution of the closure that the arc of increasing compound flow and the arc of decreasing compound flow lie in the same peripheral portion of the deposited lining.

5. The combination of a container closure lining machine wherein a blank closure is rotated beneath a needle valve nozzle to receive a lining in liquid form and means to cause the needle valve to open slowly but at an accelerating rate and thereby eliminating plug flow from the nozzle comprising a cam, said cam having a face cam contour according to the formula $$\frac{\text{Cycloidal portion of lift}}{\text{Harmonic portion of lift}} = \frac{\pi}{2\sqrt{2}}$$

and $$\frac{\text{Sum of the cycloidal portion of the lift angle}}{\text{Harmonic portion of lift angle}} = \frac{\sqrt{2}}{1}$$

said cam being linked to said needle valve to cause the lift and fall of the needle to follow a cycloidal program.

References Cited in the file of this patent

UNITED STATES PATENTS

| | | |
|---|---|---|
| 938,460 | Butler | Nov. 2, 1909 |
| 1,746,416 | Butler | Feb. 11, 1930 |
| 1,818,557 | Johnson | Aug. 11, 1931 |

OTHER REFERENCES

Rothbart: "Cams," 1956, John Wiley, esp. p. 88.